(12) United States Patent
Sihlbom

(10) Patent No.: US 6,442,220 B1
(45) Date of Patent: Aug. 27, 2002

(54) METHOD FOR EFFICIENT SYNCHRONIZATION IN A COMMUNICATION SYSTEM

(75) Inventor: Björn Ulf Anders Sihlbom, Mölndal (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/534,463

(22) Filed: Mar. 24, 2000

(30) Foreign Application Priority Data

Mar. 26, 1999 (SE) .............................. 9901123

(51) Int. Cl.⁷ .......................... H04L 27/06; H03D 1/00
(52) U.S. Cl. .................................................. 375/343
(58) Field of Search ................ 375/343; 379/93–32; 714/774

(56) References Cited

U.S. PATENT DOCUMENTS

| | | | | |
|---|---|---|---|---|
| 4,649,543 A | * | 3/1987 | Levine | 714/774 |
| 4,808,937 A | * | 2/1989 | Correa et al. | 327/159 |
| 4,829,566 A | * | 5/1989 | Lassaux et al. | 379/406.12 |
| 4,868,864 A | * | 9/1989 | Tjahjadi et al. | 379/93.32 |
| 5,392,314 A | | 2/1995 | Wolf | |

FOREIGN PATENT DOCUMENTS

EP    0 371 357 A2    6/1990

* cited by examiner

*Primary Examiner*—Chi Pham
*Assistant Examiner*—Tony Al-Beshrawi
(74) *Attorney, Agent, or Firm*—Burns, Doane, Swecker & Mathis, L.L.P.

(57) ABSTRACT

A method for discrimination of repetitive sequences in a wireless communication system in which the repetitive sequences have the same repetition length. For the discrimination the repetitive sequences are modified by changing the phase of at least one of the sequences. The auto-correlation values of the repetition sequences and of the modified repetitive sequences are calculated and the auto-correlation signs of the repetition sequences and of the modified sequences are compared.

3 Claims, 2 Drawing Sheets

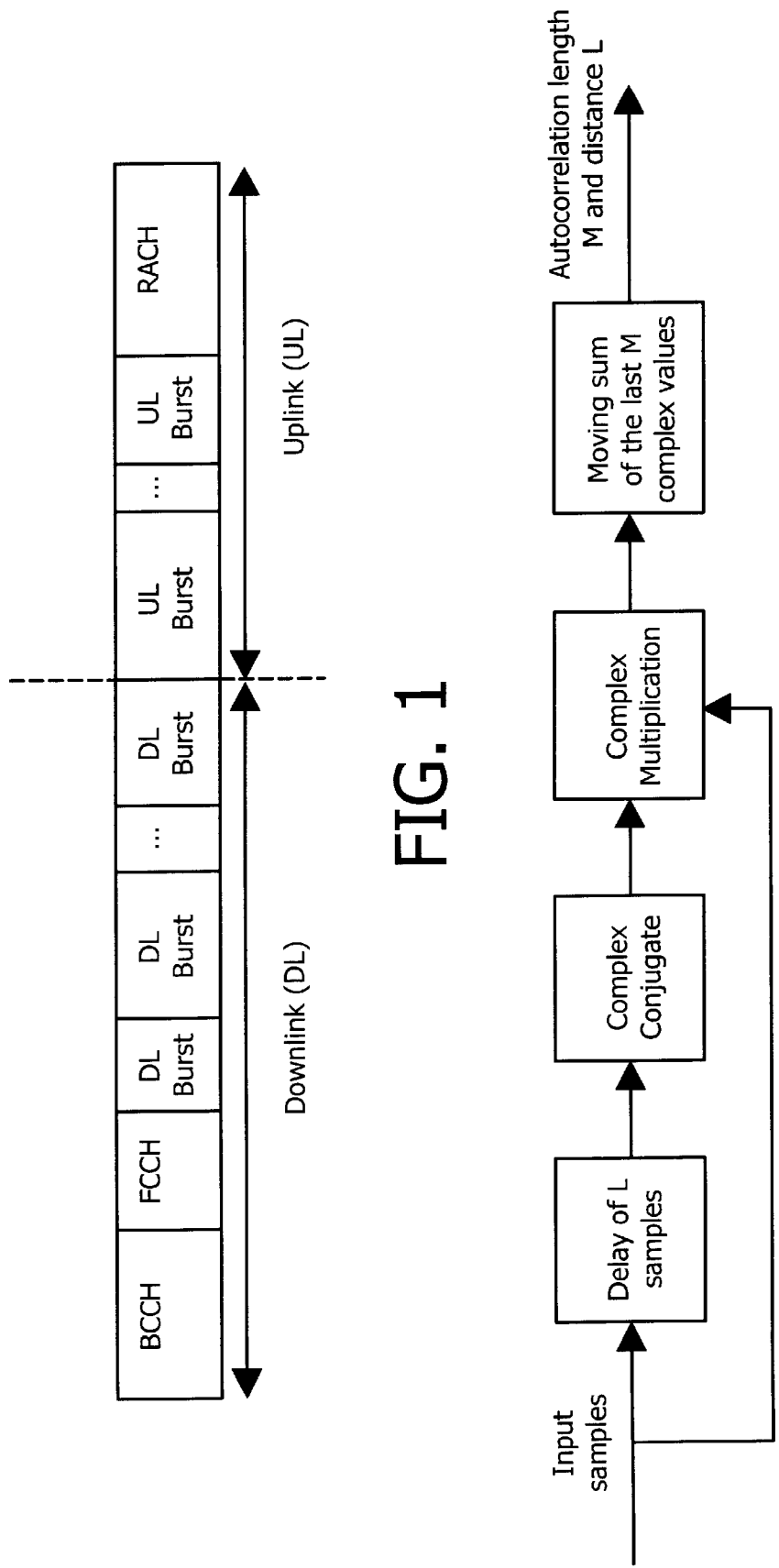

METHOD FOR EFFICIENT SYNCHRONIZATION IN A COMMUNICATION SYSTEM

FIELD OF THE INVENTION

The present invention relates to a method for efficient synchronization with the means of physical layer preambles in a communication system. More in detail the invention refers to a method for efficient synchronization of short-range high data rate communication systems that may be used as a wireless local area network and/or as a wireless asynchronous transfer mode (ATM) system as well as a public access system.

STATE OF THE ART

There is an increasing demand for short-range high data rate communication systems for wireless local area network (WLAN) and wireless ATM systems. An important feature of the new systems will be the centralised medium access control (MAC), which is intended to lead to an efficient use of the available frequency spectrum. An access point (AP), also called base station, controls the channel access by assigning capacity for both the down-link and up-link, and the mobile terminals (MT), also called terminal adapter (TA), listen and transmit in the respective "channels", e.g. time slots. Such a centralised MAC is typically used in cellular mobile radio systems like GSM.

A characteristic of such a new communication system is that protocol data units (PDUs) transport the data. In particular, there exist only a small number of PDU types, e.g. for control information (control PDU) and for the actual data (data PDU), each type having a fixed size. The new communication system is specified as comprising three parts, namely the physical layer, the data link control (DLC) comprising logical link control (LLC) and MAC, and a convergence layer (CL). The CL is the interface between higher layers and the DLC. For example, there may be a CL for TCP/IP, which segments IP packets into (data) PDUs. The DLC layer adds some header information and provides PDUs of fixed size to the physical layer.

The physical layer of the new communication system will be based on orthogonal frequency division multiplexing (OFDM). An OFDM signal consists of a given number (e.g. 64) of subcarriers, which are a sequence of orthogonal narrowband modulated carrier waves, which fill the available spectral bandwidth of a given channel. The central subcarrier is also called the DC subcarrier. The granularity of data units on the physical layer is therefore an OFDM symbol.

There are WLAN systems performing according to various standards. IEEE802.11 is an example and such systems will have a 5 GHz mode, which will include similar physical layer parameters as the system in which the invention is used. However, the IEEE802.11 system is designed for transmission of IP packets by radio. The protocol principles are similar to Ethernet; hence the MAC is very different from the system of the invention. In an IEEE802.11 system, for instance, IP packets or segments thereof with variable length are transmitted.

A MAC frame consists of several fields containing traffic control information for assigning logical channels as well as data blocks. For synchronisation and channel estimation purposes a preamble may be added at the beginning of each block.

To simplify the data format, the preambles of different channels contain repetitive sequences of the same period length, i.e. repetitions with one quarter of a 64 point FFT (Fast Fourier Transform) length. In operation in an environment with other coexisting communication systems, which might interfere with the new communication system, the coexisting systems could as well use the same repetition distance (L) where distance is the length of the repetitive sequence.

Due to the reuse of the same repetition distance, a mobile terminal might experience severe problems in synchronising with the MAC frame structure of a certain AP in a cell, since it can misinterpret the repetition distance used in the BCCH-TS with one that is used e.g. by another TA in the ULCH-TS. If this is the case, the TA should be given means to recover from such erroneous detection events, i.e. get false alarm detection as fast/soon as possible.

A second problem is spectrum requirements which might limit the power spectral density (PSD) in W/Hz in the given frequency band. If the preamble sequence always uses the same subset of sub-carriers, these will have an increased power spectral density for a typical airframe, e.g. every $4^{th}$ sub-carrier will have an enhanced PSD.

A third problem is that due to standard regulations, the DC sub-carrier cannot be used, so that there is a gap of twice as many sub-carriers around DC in the power spectrum of the repetitive preamble sequences. Hence less frequency diversity is exploited in this part of the spectrum.

SUMMARY OF THE INVENTION

The present invention is concerned with solving the above-described synchronisation, power spectral density and frequency diversity problems.

An object of the invention is to provide a method for improved discrimination of repetitive sequences having the same repetition distance and which is robust to various input power levels and frequency offsets.

Another object of the invention is to provide a method which also limits the power spectral density and the frequency diversity in a given frequency band.

The above mentioned objects are met by the invented method according to which the repetitive sequences are modified primarily by changing the phase and the corresponding auto-correlation magnitude and sign are used for the detection and discrimination of the sequences.

Advantages afforded with this invention are that the above-described problems can be solved. The invention improves the discrimination of preambles and increases the robustness of the communication system. Furthermore the invention makes possible a more efficient utilisation of the available frequency spectrum.

BRIEF DESCRIPTION OF THE DRAWINGS

For a more complete understanding of the present invention, reference is made to the following detailed description taken in conjunction with the accompanying drawings wherein:

FIG. 1 illustrates an example of a MAC frame in a dynamic TDMA/TDD system;

FIG. 3 is a flowchart illustrating the calculation of the auto-correlation.

DESCRIPTION OF PREFERRED EMBODIMENTS

Figure 2A:
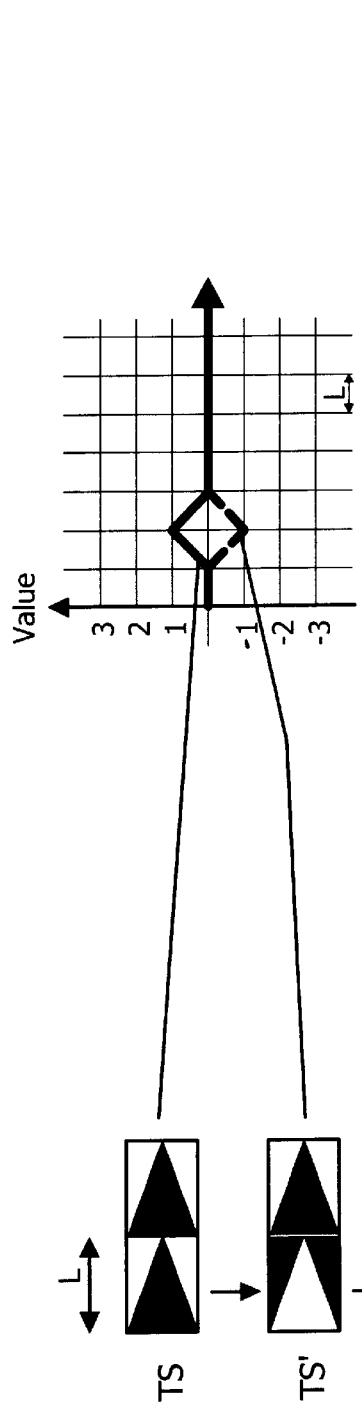
FIGS. 2a,–b and c illustrates different repetitive sequences and their corresponding auto-correlation values.

The invention will now be described in more detail. For the only purpose of facilitating the understanding the problem which is solved by the use of the invented method a more detailed example of a flexible MAC frame will be described with reference to FIG. 1.

The frame starts with a broadcast control channel (BCCH), which contains information that is transmitted over the whole cell covered by one AP. The assignment of logical channels to different MTs is transmitted in the FCCH (frame control channel), sometimes referred to as request grant channel. That means, each MT exactly knows the dedicated time period in the frame when it is expected to receive a downlink data block and/or send an up-link data block. In the following the block of data which is designated to or sent by a MT is called "burst".

Random access channels (RACH) are located at the end of the frame. A MT may request for capacity in its assigned up-link channel (ULCH or UL) or via one random access channel.

Within each field, data is transmitted from the AP to one MT, or vice versa. This transmitted data covers the whole cell. Each burst comprises one or more PDUs. On the DLC layer, the concatenation of several PDUs may also be called PDU train or "ATM cell" train in case of transmitting ATM cells. On the physical layer, a preamble may be added at the beginning of each burst for synchronisation and channel estimation purposes. The channel access scheme is dynamic TDMA. Hence, the bursts have variable length.

The preamble added to the bursts are called training sequences (the terms preamble and training sequence are used alternately in the following) and labelled with the respective channel to which they belong, e.g. BCCH-TS (BroadCast Channel Training Sequence), ULCH-TS (Up-Link Channel Training Sequence) and so can be are created by using only every m-th (m is an integer>0) sub-carrier of an OFDM symbol. It can be shown, that this leads to a pattern, which repeats itself m times within the FFT length, which for this system is 64. E.g. using every 4th subcarrier leads to a repetition sequence length L=16.

The actual purpose of the TS is detection of the frame start, measurement of received power level and frequency offset estimation. In the communication system of the invention the proposed preamble structure consists of three parts, the A, B and C parts where the A part is used for detection, power level estimation (AGC) and a coarse time estimate. This detection (and discrimination of different TS) and the estimations must be robust to different input power levels, and frequency offsets.

It should be noted that the described MAC frame is one example of a number of possible arrangements of fields. A different order of the fields may occur as well. Furthermore, some of the described fields may not appear and others may be added while the invention is still applicable.

The repetitive pattern causes a number of problems, which have been described above.

The invented solution for the these problems is as follows:

In order to reuse a repetition distance used for other training sequences, the phase information contained in the repetitive sequences is modified.

In a preferred embodiment, the individual sequences are generated in such a way that the phase of repeated samples in adjacent sequences differs by 180 degree.

This may be achieved for the particular example used to describe the preferred embodiment by shifting the set of loaded subcarriers in the frequency domain by 2 subcarriers. Thereby a linear increasing phase offset per sample is introduced in time domain which is exactly 180 degree at a distance of D=16 samples and thus realizing the desired phase property of the TS. Please note that by this method the phase information of every sequence involved in the TS is modified not only the phase information of every other sequence. The principal structure of the TS, however, is preserved by the preferred embodiment.

By doing so, the auto-correlation of such a modified repetitive training sequence will have the opposite sign compared to the unmodified repetitive sequence. The opposite signs can be used to discriminate between e.g. BCCH-TS and ULCH-TS. This discrimination is possible also for TS received with a frequency offset. The offset rotates the auto-correlation, but as long as the rotation does not exceed +/−90 degrees the discrimination is possible, simply by looking on the sign of the real part of the auto-correlation value. In the new communication system frequency off-sets up to 240 kHz may occur. With an auto-correlation offset D=16, the rotation would be less than 70 degrees. The discrimination properties are also preserved when the signal value is clipped, i.e. limited to a max value. This might be the case when receiving a signal with unknown input power level.

By using the modified TS (TS') only for BCCH-TS it is possible to detect the frame start without false alarms as all other detections are discarded by utilising the discrimination properties of TS and TS'. Other detections may come from other bursts in the MAC frame or from any other system using repetitive preambles.

For simplicity reasons, in the following the expressions "sign reversed" and other similar expressions refers to the phase modification applied to the repetitive sequences as described above although the phase modification are not necessarily achieved by a simple sign reversal but a linear increasing phase over the whole TS.

As already mentioned above, in the frequency domain, this modification is equal to a shift of the spectrum by half the distance between the sub-carriers. As an example, starting with every $4^{th}$ sub-carrier, after the sign change the sub-carrier are shifted by two. Hence the modified spectrum and the original do not overlap and use different portions of the originally allowed spectrum and therefore make it possible to use the PSD more uniformly than previously.

Furthermore the original DC sub-carrier which could not be used is now shifted to a sub-carrier allowed in the new communication system. The result is that there is no additional gap of sub-carriers in the middle of the spectrum of the modified training sequence and hence more frequency diversity can be exploited.

FIG. 2a, b and c show a number of examples of TSs (preambles) along with plots of the corresponding auto-correlation values.

FIG. 2a depicts a TS consisting of two repetitions of a given sequence (length L). The auto-correlation of the TS is plotted with a solid line in the graph. In the graph the auto-correlation length M=L and the auto-correlation offset D=L. A modified preamble TS' is created by modifying the TS by reversing the sign of either of the two repetitions (the first in FIG. 2a). In the figure (and in FIG. 2b and c), the reversed sign sequence is indicated by a vertical arrow. The auto-correlation of TS' is rotated by 180 degrees compared to that of TS (the unmodified preamble), i.e. sign-reversed and depicted with a dashed line in graph. Both the original and modified TS can be created as a regular OFDM symbol, i.e. by an inverse FFT.

Figure 2B:
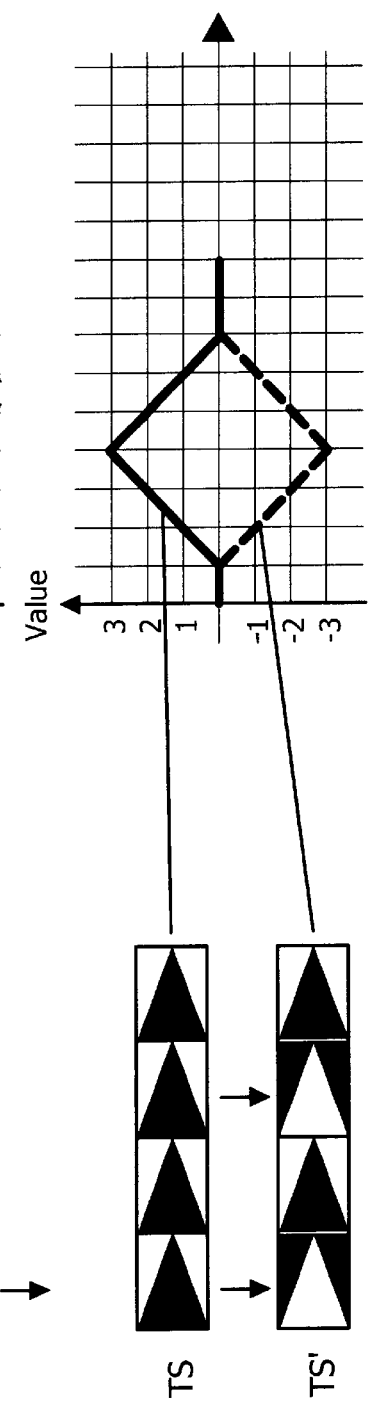

In FIG. 2b a TS is created from four repetitions of a given sequence (length L). The auto-correlation (M=3L, D=L) of this TS is plotted as a solid line in the graph. By reversing the sign of every other repetition (beginning with the first in this example) the corresponding auto-correlation is rotated by 180 degrees, i.e. sign-reversed (dashed line in the graph). Both the original and modified TS can be created as a regular OFDM symbol, i.e. by an inverse FFT.

Figure 2C:
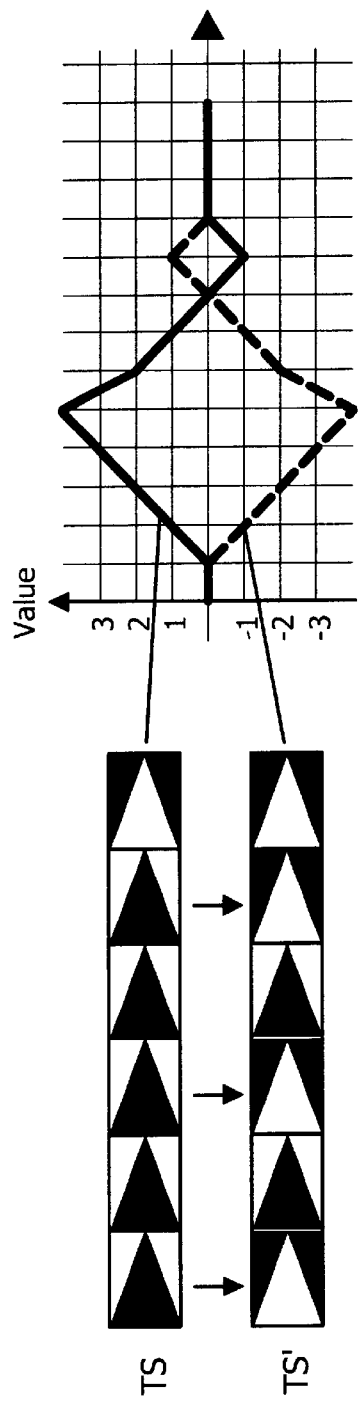

In FIG. 2c a TS consists of six repetitions of a given sequence (length L), but with the last repetition sign-reversed. The reversal of the last repetition in the TS results in that the auto-correlation magnitude falls with a greater slope after the peak, and also gives a small sidelobe. The auto-correlation (M=4L, D=L) of this TS is plotted as a solid line in the graph. By reversing the sign of every other repetition (beginning with the first in this example) the corresponding auto-correlation is rotated by 180 degrees, i.e. sign-reversed (dashed line in the graph). Note that in this example the original and modified TS can not directly be created as a regular OFDM symbol, i.e. by an inverse FFT. However, the central part (4 repetitions) is a regular symbol. This example points out that also a TS with some repetitions already sign-reversed and which might not be a regular OFDM symbol, have a corresponding TS with sign-reversed auto-correlation.

As the auto-correlation sign is depending of the phase modification of the preamble repetition, the auto-correlation sign can be utilised for discrimination of preambles. The auto-correlation magnitude is the same for the preambles which means that the performance is identical.

The robustness is achieved both by a more reliable detection of preambles and the fact that the discrimination properties (of the TS and the modified version TS') are preserved after distorsion by multipath fading, frequency offsets etc.

For clarification, it is not necessary to use FFTs or regular OFDM symbols to build a TS with the proposed discrimination properties. The invention can be used for every repetitive structure consisting of equal blocks regardless whether it is an OFDM signal or not. The same is true for the improved spectral properties in which OFDM and the usage of FFT only play a role for explanation.

An example of a flow-chart for calculating the auto-correlation value is given in FIG. 3. The distance D is created by delaying D input samples. The complex conjugate of the delayed samples are calculated and combined with the undelayed input samples in a complex multiplication. The result from the complex multiplication is then used for the creation of a moving sum of the last M complex values.

Both the amplitude and the phase of the correlation result will be exploited. The amplitude information is taken to actually detect the preamble while the phase information serves to distinguish preambles of different channels. In particular, for the described scenario in the preferred embodiment, the sign of the real part of the correlation result which is in fact phase information may be used for the distinction.

Another property of the pairs of TS (original and modified) is that they are orthogonal with respect to each other. This means that the cross correlation of such a pair gives zero as result. Therefore it is possible to distinguish between the two in a pair, either by applying an offset auto-correlation as described above, or with a cross-correlation with the known sequence, i.e. a matched filter.

What is claimed is:

1. Method for discrimination of repetitive sequences in a wireless communication system, the repetitive sequences having the same repetition length, characterised in that creating modified repetitive sequences by changing the phase of at least one of the sequences;

calculating the auto-correlation values of the repetitive sequences and of the modified repetitive sequences; and comparing the auto-correlation values of the repetition sequences and of the modified sequences.

2. Method for discrimination of preambles in a wireless communication system, the preambles having the same repetition length, characterised in that creating modified preambles by changing the phase of at least one of the preambles, calculating the auto-correlation values of the preambles and of the modified preambles;

comparing the auto-correlation values of the preambles and of the modified preambles.

3. A receiver for discrimination of repetitive sequences in a wireless communication system, the repetitive sequences having the same repetition length, characterised in means for creating modified repetitive sequences by changing the phase of at least one of the sequences;

means for calculating the auto-correlation values of the repetition sequences and of the modified repetitive sequences; and means for comparing the auto-correlation values of the repetition sequences and of the modified sequences.

* * * * *